United States Patent [19]
Yeiser

[11] 3,761,950
[45] Sept. 25, 1973

[54] X-Y PLOTTER
[75] Inventor: John O. Yeiser, Mission Viejo, Calif.
[73] Assignee: Milton Roy Company, St. Petersburg, Fla.
[22] Filed: Aug. 17, 1970
[21] Appl. No.: 64,467

[52] U.S. Cl. .................. 346/68, 346/129, 346/134
[51] Int. Cl. ............................................ G01d 9/38
[58] Field of Search ..................... 346/68, 129, 134

[56] References Cited
UNITED STATES PATENTS

| | | | |
|---|---|---|---|
| 3,380,065 | 4/1968 | Alpert et al. | 346/29 |
| 2,381,188 | 8/1945 | Swindle | 346/134 X |
| 2,777,747 | 1/1957 | Gilson et al. | 346/68 X |
| 3,360,799 | 12/1967 | Polster | 346/29 |
| 3,454,954 | 7/1969 | Mamach | 346/145 X |

Primary Examiner—Joseph W. Hartary
Attorney—Lawrence Fleming

[57] ABSTRACT

A chart recording instrument having electromechanical servos which move a pen or stylus in the X-direction along a paper chart, and move the chart with respect to the pen in the Y-direction. A novel mechanism provides for ease in loading and unloading charts, and for accurate relocation of the chart, whereby a chart can be removed from the machine and then replaced accurately without disturbing any of the gain or zero control settings. Thus a curve can be recorded, the chart removed, and then put back to record another curve in the same family. These functions are controlled by a three-position lever which lifts and lowers the pen, raises and lowers pinch rollers in the Y-axis chart drive system, controls a pair of chart positioning stops, and switches appropriate positioning voltages to the servos.

9 Claims, 6 Drawing Figures

Patented Sept. 25, 1973

INVENTOR.
JOHN O. YEISER

BY
Lawrence Fleming

AGENT.

INVENTOR.
JOHN O. YEISER
BY Lawrence Fleming
AGENT.

X-Y PLOTTER

BACKGROUND OF THE INVENTION

Many kinds of instruments are known of the class generally called X-Y plotters. Such instruments record electrical analog data on charts, such as ordinary graph paper sheets, by means of a pen, a heated stylus, or other known marking means. With respect to the recording medium, the deflection of the pen or stylus in the horizontal or X-direction is a function of one electrical input signal, and the deflection in the Y-direction, perpendicular thereto, is a function of another electrical input signal. With the input signals derived from suitable transducers, such instruments are used for example to record curves of strain vs. stress, or pressure vs. temperature.

In a typical instrument of this class, potentiometers or other transducers are linked mechanically to the pen-driving means, and their outputs compared with the input signals at the input terminals of servo amplifiers. These amplifiers in turn drive servo motors which operate to position the pen in the X and Y directions.

Such instruments are often complex and costly. Many lack convenient means for plotting families of curves without drawing superfluous lines on the chart, incident to changing gain or zero settings or to removing and replacing the chart on the machine. Many, moreover, lack means to replace a chart on the machine accurately in the same position, so that zero controls must be manipulated after the chart is again in place; this again draws unnecessary lines on the chart. Many prior instruments require special chart paper with edge perforations; the present invention does not.

BRIEF SUMMARY

The present invention is an X-Y plotter which may use a conventional electrical system, but has a novel mechanical system with respect to driving the chart, loading and positioning the chart, raising the pen, and accurately establishing the coordinates when the chart is replaced. All the functions needed in replacing a chart to resume plotting on the same coordinates are simply controlled by a single lever.

The instrument of the invention has a flat top or table, on which the chart is laid. Extending across this table at about its middle is a pen carriage mechanism which supports and guides the pen or other marking device for motion in the horizontal or X direction. The details of this X-driving means are not a part of the invention.

Adjacent each end of the pen carriage mechanism is a pair of chart rollers. The lower, or driving roller of each pair may be knurled or otherwise provided with an anti-slip surface; its upper rim is approximately tangent to the table top. These chart driving rollers frictionally engage the bottom surface of the chart near its edges. They are rotated by servo means to move the chart in the Y direction in response to Y input signals. The chart is held against each chart driving roller by the upper roller or pinch roller of each pair, positioned above the chart. When a chart is to be removed or inserted, the pinch rollers are raised up by a novel mechanism. This chart driving means is found to be positive and precise, and the charts may be ordinary graph paper without edge perforations or the like.

Adjacent each pinch roller is a chart stop member. During the loading of a chart, the chart is passed under the pinch rollers (which are raised), and its bottom edge butted against these stops. The stops thus position the chart accurately in the Y direction. The stops protrude up through slots in the table. When the machine is in operation with the pinch rollers engaged, the above novel mechanism retracts the stops so that they do not interfere with the motion of the chart.

The novel control mechanism of the invention is concerned with four machine functions: raising and lowering the pinch rollers; raising and retracting the chart stops; lifting the pen; and driving the servos to a desired starting or "zero" position. These control functions are accomplished through the means of a three-position control lever. Instead of a lever, a knob or other suitable manually operable element may be used, within the purview of the invention. Cooperating with the control lever is a locking cam mechanism for raising the pen or marking element, which is manually unlocked when the pen is to be lowered onto the chart.

The control lever positions are associated with the following operations. In position 1, the pen is raised off the chart, the pinch rollers are open, the chart stops are up, and the servos are driven against mechanical stops to a "start" or "chart edge" position. The machine is now prepared for the insertion or loading of a chart. The chart is manually pushed under the pen and the pinch rollers, and its edge butted against the chart stops. The Y servo has rotated the chart drive rollers into a position corresponding to that of the edge of the chart; other movements of these rollers will thereafter be made with reference thereto. When the control lever is moved to position 2, the pinch rollers are closed and the chart stops retracted beneath the table; and the servos are disconnected, the chart and pen remaining in the same positions. The pen remains up. In position 3 of the control lever, the pinch rollers, chart stops, and pen remain as before but the servos are connected to their respective amplifiers. The pen and chart will now move as dictated by the input signals and the electrical gain and zero settings (not a part of this invention). When the pen and chart are in the positions so determined, the pen may be lowered by unlocking the pen cam. Recording may now begin.

By the use of this invention, it is possible and convenient to change charts, or to remove and replace a chart, without disturbing the relation between the edges of the chart and the positions of the servos. Thus, related curves or families of curves can be recorded readily on the same or different charts without any errors due to changes in the mechanical positioning of the paper, and without the machine drawing any superfluous lines incident to correcting the position of the chart or to the manipulation of controls.

The invention will now be described in detail.

DETAILED DESCRIPTION

Figure 3:
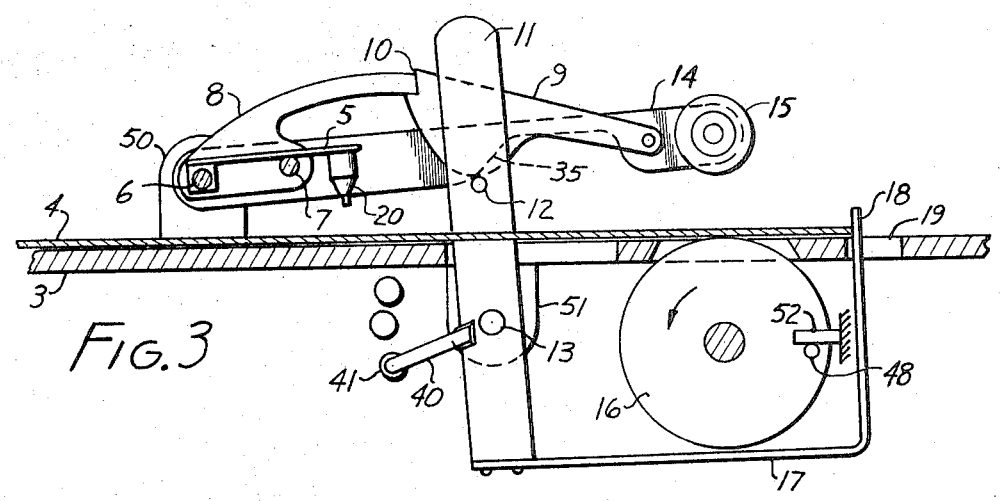
Figure 4:
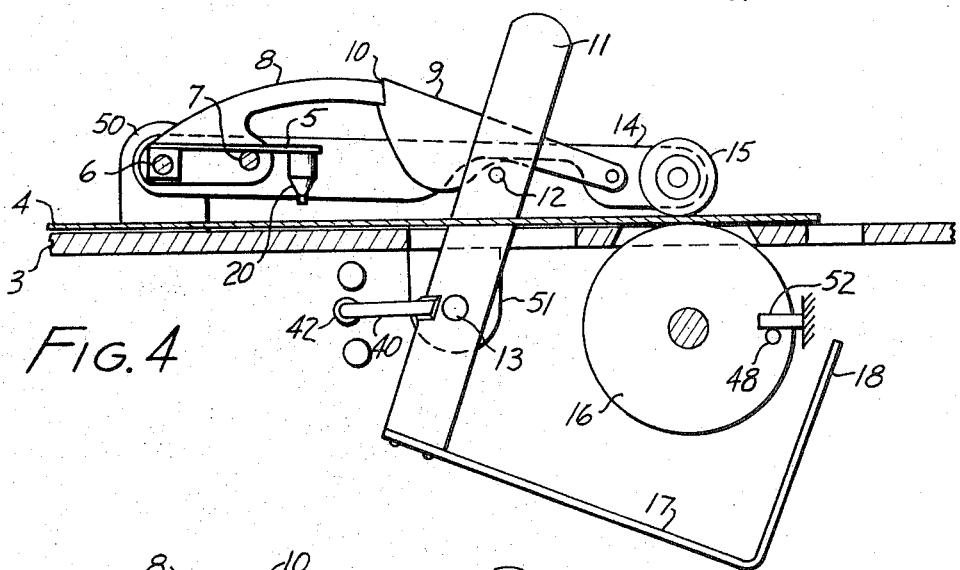
Figure 5:
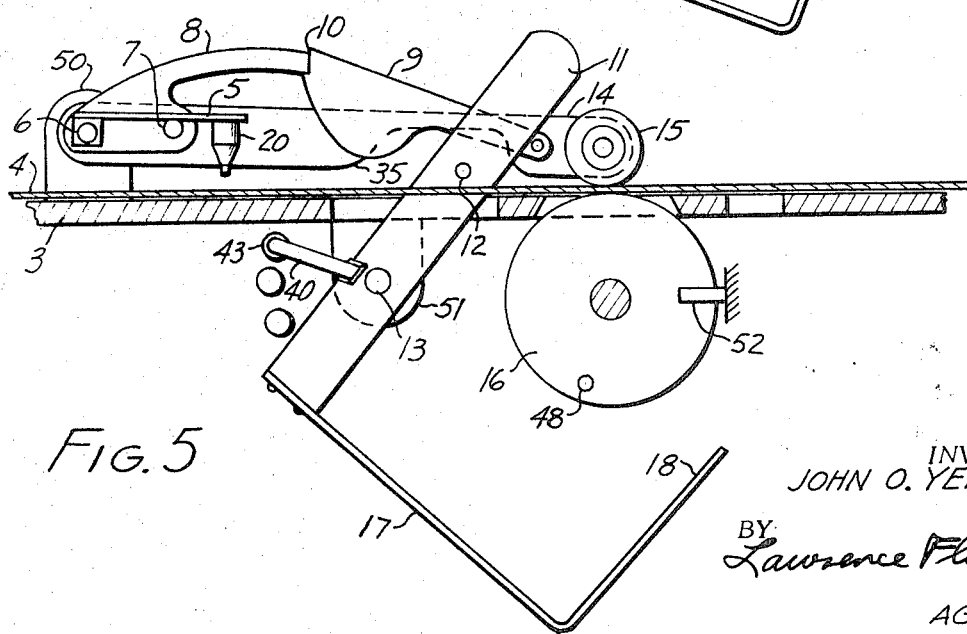
Figure 6:
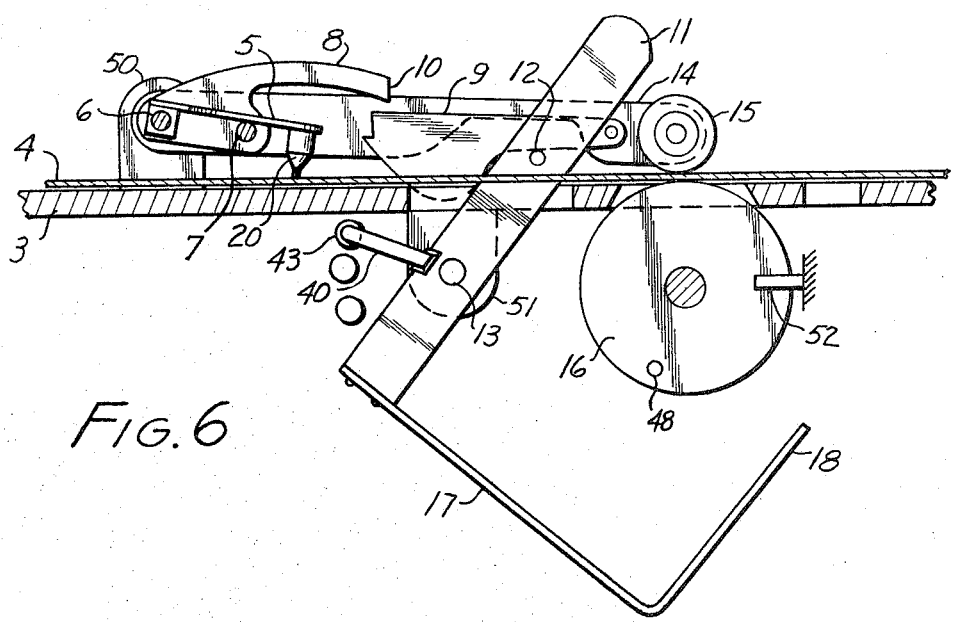

FIGS. 3, 4, and 5 are partial side elevations of the mechanism of the invention with the control lever in its three different positions; and FIG. 6 is a view similar to FIG. 5 but with the pen lowered.

Figures 1, 2:
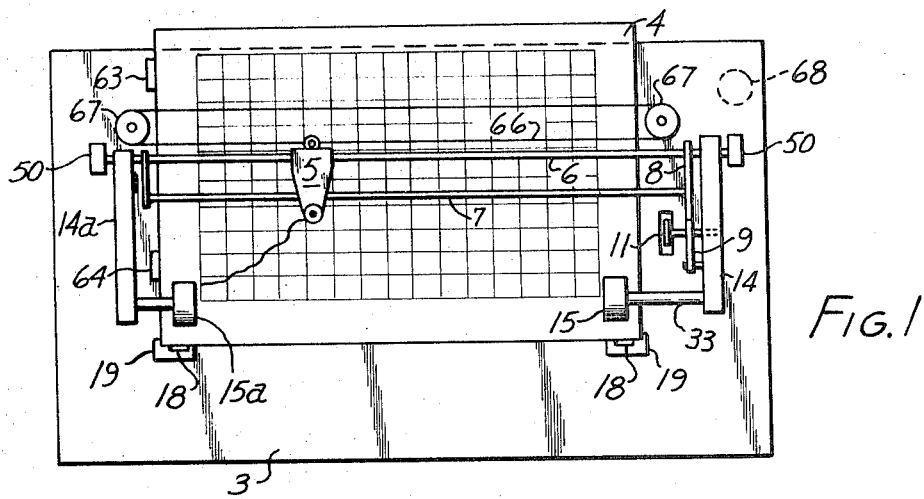
FIG. 1 is a simplified top view of a complete X-Y plotter according to the invention.
FIG. 2 is a partial perspective view of the mechanism of the invention.

Referring first to FIG. 1, the instrument of the invention has a generally flat top 3, on which is placed a chart 4, which may for example be a sheet of ordinary graph paper. Extending generally across the table 3 is a pen carriage assembly comprising a pen carriage 5, a pen guide bar 6 along which it slides, and a pen lifting bar 7. The ends of pen guide bar 6 may be rotatably mounted in support members or blocks 50. Fixed to guide bar 6 is a pair of pinch roller arms 14, 14a, each carrying at its end a pinch roller 15, 15a. Paper or chart stops 18 are adapted to protrude up through slots or openings 19 in the table 3. Pen lift arm 8, pen lifting cam 9, and control lever 11 are indicated in FIG. 1, but are shown better in FIGS. 2 – 6. In FIGS. 1 and 2, the means for driving the pen carriage 5 back and forth across the table in the X direction may comprise a flexible cable 66 running on pulleys 67 and driven by a servo 68 or other X-motor means, in known manner, or other known means. Such driving means do not form part of the invention. Stationary stops or guides 63, 64 may be provided to locate the position of a vertical edge of the paper (in the X-direction).

Referring now to FIG. 2, portions of the mechanism are shown in perspective with the table 3 omitted, to show the elements which lie below it more clearly. Support elements such as blocks 50, 51, and 69 are drawn with hatching on one or more edges, to indicate that they are rigidly attached, directly or indirectly, to the machine table 3. In FIG. 2, a portion of a chart 4 is shown between the drive roller 16 and the pinch roller 15. Drive roller 16 may be provided with a surface having a high coefficient of friction 16', by knurling or by a layer of rubber or the like. Drive roller 16 is attached to a shaft 30 which rotates in bearings (not shown) which are mounted to the underside of table 3 or to other appropriate parts of the machine frame (not shown). On the left-hand end of shaft 30 is another drive roller 16 (not shown), which lies below the pinch roller 15a shown at the left-hand side of FIG. 1. Drive rollers 16 are rotated by servo motor means 31, FIG. 2, through any suitable mechanical connection, indicated schematically by dotted line 32. These may be here termed Y-motor means. When the pinch rollers 15, 15a are pressed down against the chart 4, rotation of the drive rollers 16 will move the chart in the Y-direction, as indicated by the double-headed arrow Y in FIG. 2.

The pinch rollers are mounted for free rotation on stub shafts 33, which are fixed to the end portions of pinch roller arms 14, 14a. One arm 14 is shown in FIG. 2. The back end portions of both arms 14, 14a may be fixed as at 34 to pen guide bar 6 (which in turn is rotatably mounted in support blocks 50). Thus, when one arm 14 is raised, the other will move with it, linked by the guide bar 6.

Arm 14, FIG. 2, may be raised up by moving a control lever 11 toward the back, in the direction of arrow 60. When lever 11 is so moved, a camming element or cam pin 12 attached to the lever 11 engages a cam surface 35 on the underside of arm 14. A portion of the underside of arm 14 may be cut away to provide this cam surface 35, as shown in FIG. 2. The purpose of raising arm 14 is to provide room between pinch roller 15 and driving roller 16, so that a chart such as 4 may be removed from the machine or inserted thereinto.

The cam pin 12 attached to control lever 11 also operates a pen cam or marker lifting cam 9. When lever 11 is moved toward the back, in the direction of arrow 60, pin or element 12 raises the pen cam 9 upward. The pen cam 9 is pivoted to the arm 14 at 36. It has a notch at its end which engages the end of a pen lifting arm 8, as indicated at 10. Thus, when control element or lever 11 is moved back, it raises pen cam 9, which is turn raises the end of pen lifting arm 8, which in turn raises pen lifting bar 7 and hence the pen or marker 20. Pen lifting arm 8 is pivoted onto pen guide bar 6 at a point indicated at 37. When pen cam 9 and lifting arm 8 are engaged at the notch 10, the geometry is such that they will stay locked together in the "up" position. The pen can be lowered by mannually pulling the lifting arm 8 upward, out of engagement with the notch on cam 9, allowing the pen to drop. These functions will be described more completely in connection with the detailed showings of the different positions of the mechanism in FIGS. 3 – 6.

A pair of chart stops 18 are linked to the manual control element or control lever 11 by any suitable means, such as being attached to an extension of lever 11 at a point such as 38, FIG. 2, via a rigid intervening member 17. When lever 11 is moved back, in the direction of arrow 60, the chart stop 18 is moved upward, as indicated by arrow 61. Only one of the chart stops 18 is shown in FIG. 2; the other is similar and located at the left side of the machine, as indicated in FIG. 1.

A roatary switch is linked mechanically to lever 11. It is shown schematically in FIGS. 2 – 6 as an arm 40, mounted to lever 11, and three stationary contacts 41, 42, 43. The switch arm 40 is insulated from the lever 11 and from the frame of the machine by conventional insulating means, not shown. When switch arm 40 is on contact 41, it connects a voltage source 44 to the Y-servo motor 31, which drives the shaft 30 and driving roller 16 until a pin 48 hits a stationary mechanical stop 52. These stop means may be a multi-turn counting stop of known type. When switch arm 40 is on contact 42, the servo is disconnected, and the drive rollers 16 remain in the same position. When switch arm 40 is on contact 43, the servo 31 is connected to its regular servo driving amplifier 44, and is ready to be driven by it to move the chart in the Y-direction.

It will be understood that in a complete X–Y plotting instrument which embodies the invention, there will be additional elements which are omitted here for clarity of illustration; such elements do not form part of the invention. Chief of these are: (1) mechanoelectric transducers such as potentiometers linked to the X and Y motor means, (2) appropriate connections from such transducers to the Y-servo amplifier 44, and to the X-servo amplifier which is not shown. All these elements may be constructed and disposed as is known in the art of X–Y plotting instruments.

Referring now to FIGS. 3, 4, 5, and 6, the detailed operation of the mechanism associated with the functions of the control lever will be described. All these Figures are partial plan views of the mechanism looking generally in the direction of the arrow 62 of FIG. 2. They show the mechanism in different positions, as the control element or lever 11 is in the positions designated 1, 2, and 3. FIG. 6 shows the mechanism in lever position 3, similarly to FIG. 5, except that the pen 20 has been lowered.

In FIG. 3, the control element or lever 11 is in a position here designated Position 1, all the way to the left (toward the back of the instrument as seen in FIG. 1).

Cam pin 12, in contact with cam surface 35 on arm 14, has raised arm 14 up, so that pinch roller 15 is out of contact with the driving roller 16. Camming element or cam pin 12 has also raised the pen or marker cam 9, which in turn has engaged the pen lifting arm 8 and rotated it several degrees counterclockwise, so that pen lifting bar 7 is raised up and has raised the pen 20 on pen carrier 5. This position has placed the instrument in condition for the insertion or removal of a chart 4. In addition, this position provides for the protrusion of paper stops 18 up through the openings 19. In FIG 3, a chart 4 is shown, just after being inserted into the instrument. It has been loaded from the back, under the pen or marker 20, under pinch roller 15, and up against the chart stop 18. Finally, the switch arm 40 is on switch contact 41. Referring back to FIG. 2, this position of the switch connects the Y-servo to a voltage source 44, which runs the chart drive rollers 16 all the way to a mechanical stop, which corresponds to the edge of the chart in the Y-direction. The stop mechanism is indicated in FIGS. 2 – 6 as a pin 48 adapted to contact a stationary member 52. In practice, the drive roller 16 may be chosen so that its circumference is, say, one-half or one-third the length of the chart in the Y-direction, and a two-turn or three-turn counting stop mechanism of known type employed instead of the simple single-turn stop illustrated here.

It will be seen that when the control lever 11 is in position 1, all those functions are accomplished which are required for the insertion or removal of a chart, including the return of the chart drive system to a position corresponding exactly with the position of the chart, i.e., a calibration.

FIG. 4 shows the same mechanism is position 2, which may be termed the "ready" position. Here, the pinch roller 15 has been lowered against the chart, and the paper stop 18 retracted. The switch arm 40 is on contact 42, to which there is no connection; the servo is disconnected and the chart drive rollers 16 remain where they are. The pen 20, however, is still up, because the pen lifting arm is latched up by its engagement with the pen cam 9 at the notch 10. Note that the cam pin 12 is now out of contact with the pen cam 9; it is the engagement at point 10 that keeps the pen up.

FIG. 5 shows the same mechanism in position 3, which is here termed the "operate" position. Here, all mechanical variables are in the same operative state as in position 2, but the switch arm 40 is on contact 43, which connects the servo motors to their respective amplifiers. The servos now move the pen 20 and the chart 4 to whatever positions are dictated by the electrical input signals and controls. This displacement has been indicated in FIG. 5 by showing the chart 4 farther to the right, and the stop pin 48 on drive roller 16 angularly displaced from its original positions of FIGS. 3 and 4. The pinch roller 15 is down, the paper stop 18 retracted, and cam pin 12 is out of contact with both the cam surface 35 and the pen lifting cam 9. The pen 20 is still up. Thus the electrical controls (not shown) and the input signals may be manipulated until the pen 20 is in a desired position without its making undesired marks on the chart.

FIG. 6 shows the mechanism in the same state as in FIG. 5, but with the pen down. The pen is lowered by manually raising the pen lifting arm 8 until its tip portion is clear of the notch 10 on the pen lifting cam 9, then letting it drop. The latching action at point 10 is thus removed, and the cam 9 drops down against the cam pin 12 and plays no further part in the proceedings. The instrument is now in a state to record graphically with the pen 20 on the chart 4.

The functions of control lever 11 may be summarized as follows:

| Lever position | Pen | Pinch rollers | Chart stops | Servos |
|---|---|---|---|---|
| 1 | up | up | up | edge position |
| 2 | up | down | retracted | disconnected |
| 3 | up | down | retracted | normal |

It is noted that the functions of the switch means 40–43, as they cooperate with the mechanism associated with control lever 11, form an important part of the present invention, by supplying a reference datum or calibration level. Assume for example that the instrument has plotted a curve which begins at coordinates $x = 0$, $y = 50$, that the chart has been removed, and that it is desired to have it plot another curve beginning at the same point on the chart. To do this, the control lever 11 is set at position 1 and the chart reinserted. The servos are automatically driven to positions corresponding to the edges of the chart, and the chart is mechanically positioned in accordance therewith by the chart stops 18. The lever is now moved briefly to position 2, then to position 3. Assuming that the electrical control settings and input signals are unchanged, the pen and chart will be automatically moved to the correct starting point for the new curve, i.e., $x = 0$, $y = 50$. The pen may now be lowered as described in connection with FIG. 6, and the new recording operation initiated.

In the simpler case where it is desired to begin recording at the origin of coordinates, it is only necessary to set the electrical zero controls (not shown) of the plotter so that the pen is at ($x=0$, $y=0$) when the control lever is in position 3. This starting position will then repeat on other charts when they are replaced as described above, so long as the printed coordinate grids on the charts have the same location relative to the edges of the paper. The instrument of the invention does not require chart paper having special sprocket perforations or the like, since the drive rollers 16 provide a positive drive; so that ordinary graph paper or the like is satisfactory.

The invention is not limited by the foregoing description, but only by the scope of the appended claims.

I claim:

1. An X–Y plotter comprising:
   a table adapted to support a cut chart slidably thereon;
   a fixed carriage guide extending across said table in an X-direction;
   a carriage with a marking element, supported by said guide and movable therealong to provide X-deflection of said marking element across said chart;
   driving roller means with pinch roller means engageable with said chart to provide bidirectional recording displacement of said chart across said table in the Y-direction orthogonal to said X-direction;
   electromechanical X-servo means connected drivably to said carriage; and
   electromechanical Y-servo means connected drivably solely to said driving roller means,
   said bidirectional displacement of said cut chart being the sole provision for relative displacement of said chart and said marking element for recording in said Y-direction.

2. An X-Y plotter as in claim 1, further comprising:
a manual control element adapted to release said pinch roller means to release said chart, and
a retractable chart stop connected to said control element to protrude above said table when said pinch roller means are released and to retract below said table when said pinch roller means are engaged,
said stop serving to position a replaced chart on said table in a calibrated manner, and to permit normal operation of said plotter when it is retracted and said pinch roller means engaged.

3. The structure of claim 11, further comprising:
a multi-position switch linked mechanically to said manual control element, and
electrical connections from said switch to cause said Y-servo means to run said driving roller means to a zero position to permit locating said chart in a calibrated manner against said stops.

4. An X-Y plotter comprising:
a table adapted to support a chart slidably thereon;
a carriage guide extending across said table in an X-direction;
a carriage with a marking element supported by said guide and movable therealong;
a driving roller engageable with said chart to move it in a Y-direction orthogonal to said X-direction on said table;
electromechanical X-motor means connected drivably to said carriage;
electromechanical Y-motor means connected to said driving roller;
a pinch roller on a pinch roller arm movable between an engaged and a disengaged position with respect to said driving roller;
a chart stop supported movably below said table to have a protruding position above said table and a retracted position;
a marker lifting arm;
a marker lifting cam engageable therewith;
a control lever having a first and a second position;
a connection between said lever and said chart stop; and
a camming element on said control lever engageable with said pinch roller arm and with said marker lifting cam;
said pinch roller being moved to said disengaged position, said chart stop to said protruding position, and said marker being lifted when said control lever is in said first position, and
said pinch roller being engaged and said chart stop retracted when said control lever is in said second position.

5. The structure of claim 5, wherein:
said marker lifting arm is disposed for locking engagement with said marker lifting cam to hold said marker in lifted position,
said locking engagement being manually releasable.

6. The structure of claim 5,
said control lever having a third position and being mechanically connected to a multi-position switch,
and edge stop means mechanically connected to said Y-motor means,
contacts on said switch connecting said Y-motor means to an electrical source to run them against said edge stop means when said control lever is in said first position,
said contacts disconnecting said Y-motor means when said lever is in said second position, and
said contacts connecting said Y-motor means for normal operation when said control lever is in said third position.

7. The structure of claim 4,
said marker lifting cam being pivoted to said pinch roller arm, and
said pinch roller arm having a cam surface adjacent said marker lifting arm,
the engagement of said marker lifting arm and said marker lifting cam being at the end portions thereof by means of a notch.

8. The structure of claim 4,
said carriage guide comprising a guide bar, and
said marker lifting arm being fixed to a marker lifting bar extending generally parallel to said guide bar.

9. The structure of claim 4, further comprising:
a second driving roller,
a second pinch roller, and
a second chart stop,
said chart stops protruding up through openings in said table in said protruding position,
and the cylindrical surfaces of said driving rollers being knurled.

* * * * *

UNITED STATES PATENT OFFICE
CERTIFICATE OF CORRECTION

Patent No. 3,761,950            Dated September 25, 1973

Inventor(s) John O. Yeiser

It is certified that error appears in the above-identified patent and that said Letters Patent are hereby corrected as shown below:

Claim 3, first line, change "of claim 11" to: -of claim 2-.

Claims 5 and 6, first line of each, change "of claim 5" to: -of claim 4-.

In the specification:

Column 3, line 34, change "(not shown)" to: in a block 69-.

Column 5, after line 27, insert: - It is obviously assumed that the circumference of drive roller 16 may also be substantially equal to the useful length of the chart in the Y-direction. -

Column 6, line 44, the word after "so" should be: - that - .

Signed and sealed this 29th day of January 1974.

(SEAL)
Attest:

EDWARD M. FLETCHER, JR.
Attesting Officer

RENE D. TEGTMEYER
Acting Commissioner of Patents